Patented May 24, 1938

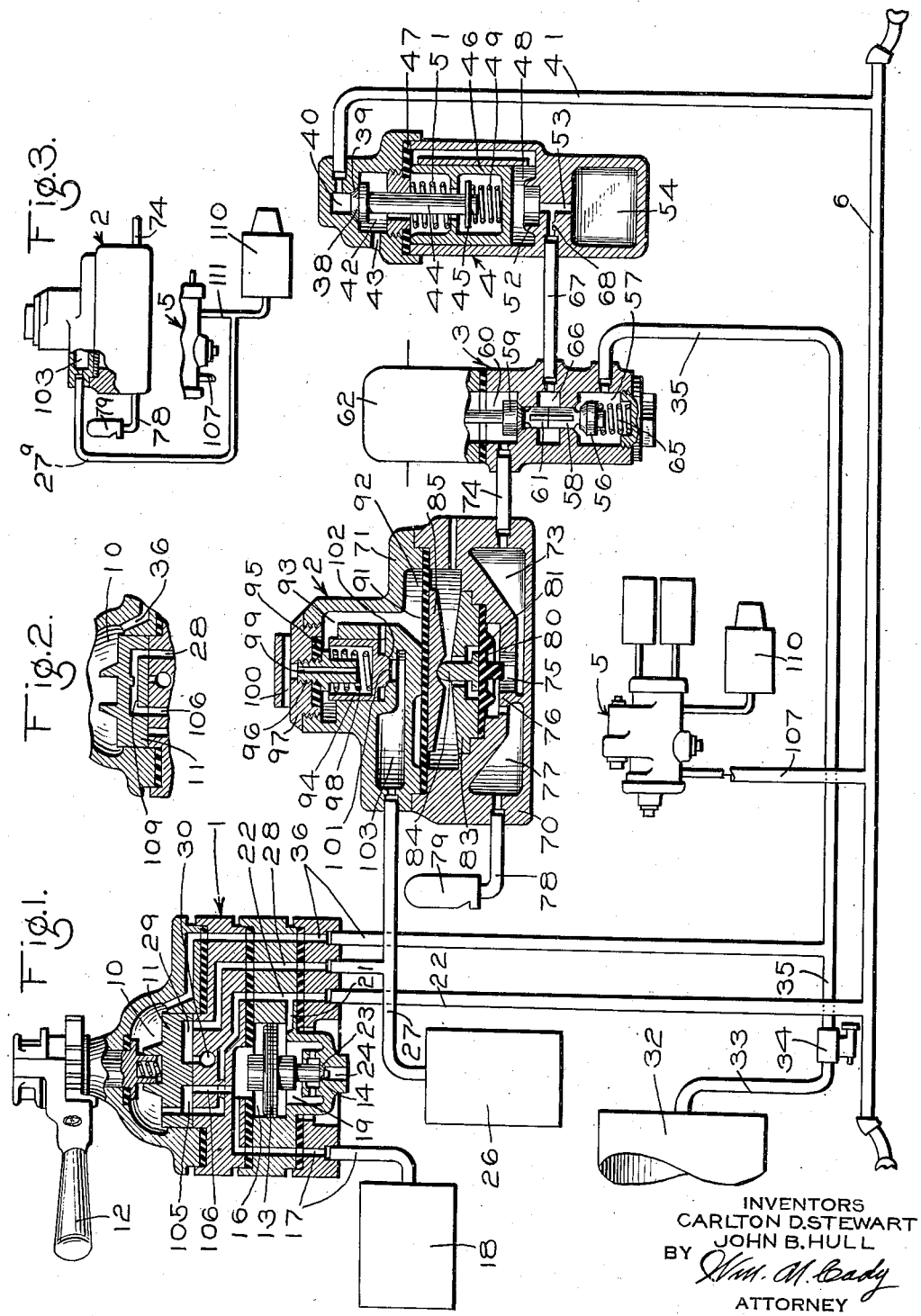

2,118,422

UNITED STATES PATENT OFFICE 2,118,422

FLUID PRESSURE BRAKE

Carlton D. Stewart, Swissvale, Pa., and John B. Hull, Berkeley, Calif., assignors to The Westinghouse Air Brake Company, Wilmerding, Pa., a corporation of Pennsylvania Application January 16, 1937, Serial No. 120,920

15 Claims. (Cl. 303—18)

This invention relates to fluid pressure brakes, and more particularly to the type having associated therewith train control apparatus controlled in accordance with traffic conditions.

It has heretofore been proposed to provide train control apparatus controlled from the track in accordance with traffic conditions for effecting automatic applications of the brakes, and which embodies suppression means by which the motorman may prevent an automatic application by acting promptly in response to an unfavorable traffic signal to effect an application of the brakes in the usual manner. In certain classes of service it is desirable that the train control suppression means be embodied in a separate device of simple construction that may be independently mounted on the vehicle and which will operate to prevent an automatic train control application of the brakes only when a predetermined degree of application of the brakes has been made within a certain interval after an unfavorable traffic indication.

One object of our invention is to provide improved means which is operative only when a service application of the brakes is actually effected for suppressing an automatic application of the brakes by operation of a train control apparatus.

Another object of our invention is to provide a train control suppression valve device for a fluid pressure brake and train control system including a brake valve and a reduction limiting reservoir, which device is operative by fluid pressure in the reduction limiting reservoir to prevent an automatic application of the brakes by operation of the train control means.

It is a further object of our invention to provide a device of the above type which may be operated by brake cylinder pressure to suppress a train control application of the brakes.

In the accompanying drawing, Fig. 1 is a diagrammatic view, mainly in section, of a fluid pressure brake and train control system embodying my invention; Fig. 2 is a fragmentary sectional view illustrating the service position of the brake valve device shown in Fig. 1; and Fig. 3 is a diagrammatic view of a portion of the apparatus shown in Fig. 1 and illustrating a modified form of my invention.

Referring to Fig. 1 of the drawing, the fluid pressure brake and the train control equipment comprises a brake valve device 1, a suppression valve device 2, a magnet valve device 3, a timing valve device 4, a brake controlling valve device 5 and the usual brake pipe 6. The brake controlling valve device 5 may be of any suitable type adapted to operate on a service rate of reduction in the pressure of fluid in the brake pipe 6 to effect a service application of the brakes and upon a reduction in brake pipe pressure at an emergency rate to effect an emergency application of the brakes.

The brake valve device 1 comprises a casing having a valve chamber 10 within which is mounted a rotary valve 11 adapted to be operated by means of a handle 12, and is provided with a discharge valve mechanism including an equalizing piston 13 and a discharge valve 14 controlled by the piston. The equalizing piston 13 has on one side a chamber 16 connected through a passage and pipe 17 with an equalizing reservoir 18, and has on the other side a chamber 19, which is connected through a passage 21 and a passage and pipe 22 with the brake pipe 6. The discharge valve 14 is adapted normally to engage a valve seat 23 for controlling communication from the chamber 19 to an atmospheric exhaust passage 24.

Associated with the brake valve device 1 is a reduction limiting reservoir 26 connected by way of a pipe 27 with a passage 28 in the brake valve casing, the passage 28 being connected through a cavity 29 formed in the rotary valve 11 with an atmospheric exhaust passage 30 when said rotary valve is in the release position as shown in Fig. 1 of the drawing. A main reservoir 32 is provided and is connected through a pipe 33 to the inlet of a feed valve device 34, the outlet of which is connected by way of a pipe 35 and a pipe and passage 36 with the valve chamber 10 in the brake valve device 1.

The timing valve device 4 is adapted to effect an automatic emergency application of the brakes, and has mounted therein a discharge valve 38 which is adapted to engage a valve seat 39 and controls communication between a chamber 40 connected by way of a pipe 41 with the brake pipe 6 and a chamber 42 which communicates through a passage 43 with the atmosphere. The discharge valve 38 has a stem 44, the lower end of which is provided with a collar 45 and extends within a valve piston 46 which is slidably mounted in a suitable bore in the timing valve device. The valve piston 46 is adapted to be urged upwardly into seating engagement with a gasket 47 by the pressure of fluid in a chamber 48, and with the valve piston in this position a spring 49 interposed between the lower wall thereof and the collar 45 of the stem 44 is adapted to maintain the discharge valve 38 in engagement with the seat 39 as shown in the drawing. A spring 51 is provided for urging the valve piston 46 downwardly toward an annular seat rib 52 which surrounds a passage 53 connecting the chamber 48 to a timing reservoir 54 formed within the timing valve device.

The magnet valve device 3 is arranged to control operation of the timing valve device 4 in accordance with railway traffic conditions, and comprises a supply valve 56 mounted in a valve chamber 57 and having a fluted stem 58, a vent valve 59 mounted in a valve chamber 60 and having a fluted stem 61 which operatively engages the stem 58, and a magnet 62, which, when energized, is adapted to maintain the vent valve 59 seated and the supply valve 56 unseated. A spring 65 is disposed in the valve chamber 57 for urging the valves 56 and 59 into their seated and unseated positions, respectively.

The magnet 62 is adapted to be controlled in accordance with traffic conditions in such a manner that while traffic conditions are favorable, the magnet will be energized, but when traffic conditions become unfavorable for any reason, said magnet will be deenergized. The supply valve 56 controls communication between the valve chamber 57 and the chamber 66 which surrounds the fluted stems 58 and 61, and the chamber 66 is connected by way of a pipe 67 and a restricted passage 68 in the casing of the timing valve device 4 to the passage 53 and timing chamber 54. The vent valve 59 is operative to establish communication from said chamber 66 to the valve chamber 60.

According to our invention, the suppression valve device 2 comprises casing sections 70 and 71, which may be secured together in any suitable manner. The casing section 70 has formed therein a chamber 73, which is connected by way of a pipe 74 with the valve chamber 60 in the magnet valve device 3, and communicates by way of an aperture 75 formed in a web portion 76 with a chamber 77 that is connected to the atmosphere through a pipe 78 and a whistle device 79. For controlling communication between the chambers 73 and 77 there is provided a flexible diaphragm 80 which has an annular seating rib 81 aligned for seating engagement with a seating face of the web 76 surrounding aperture 75, said diaphragm being mounted between a shoulder formed on the casing section 70 and a plate member 83 secured thereto in any suitable manner.

Engaging the upper side of the diaphragm 80 is a follower member 84, the upper end of which extends through a central opening in the plate 83 and is engaged by a follower plate 85 that is in engagement with the under side of a flexible diaphragm 91 mounted between the casing sections 70 and 71. The diaphragm 91 has a larger pressure area than the diaphragm 80, and together with the casing section 71 forms a chamber 92 communicating with an upwardly extending passage 93 in said casing section.

A valve piston 94 is slidably mounted in a suitable bore formed in the casing section 71 and is movable upwardly into sealing engagement with a gasket 95 which is centrally secured by means of an element 96 in a recess formed in a cap 97 having screw threaded engagement with said casing section. A spring 98 is provided for urging the valve piston away from the gasket 95 to permit communication from the passage 93 past said valve piston and through a passage 99 in the element 96 and a passage 100 to the atmosphere. The valve piston 94 has a seating face 101 formed on the lowermost portion thereof that is adapted to engage a seat 102 formed within the casing section 71 for controlling communication from the passage 93 to a chamber 103, which is connected to the reduction reservoir 26 by way of the pipe 27.

In operation, fluid under pressure supplied in the usual manner to the main reservoir 32 flows therefrom through the pipe 33 to the feed valve device 34, which is operative to supply fluid at the desired pressure to the pipe 35 and thence through pipe and passage 36 to the valve chamber 10 in the brake valve device 1. With the brake valve device in release position, fluid under pressure is supplied from the valve chamber 10 through a cavity 105 formed in the rotary valve device 11 and a passage 106 registering therewith to the chamber 16, and thence by way of passage and pipe 17 to the equalizing reservoir 18. The cavity 105 also registers with the passage 22, so that fluid under pressure is at the same time supplied through said passage and the passage 21 to the chamber 19 in the brake valve device 1, and through the pipe 22 to the brake pipe 6.

As the brake pipe 6 is thus charged with fluid under pressure, the brake controlling valve device 5, which is connected to the brake pipe by way of a branch pipe 107, is operated in the well known manner to its release position for supplying fluid under pressure to the usual auxiliary and supplementary reservoirs.

Assuming that the traffic conditions are favorable so that the train is permitted to proceed, the magnet 62 of the magnet valve device 3 is energized as hereinbefore explained, and the vent valve 59 is thereby held seated while the supply valve 56 is held unseated, as shown in the drawing. Fluid under pressure supplied by the feed valve device 34 through the pipe 35 to the chamber 57 is thus permitted to flow past the unseated valve 56 and through the chamber 66, the pipe 67, the restricted passage 68 and passage 53 in the timing valve device 4 to the chambers 48 and 54 therein. Fluid under pressure in the chamber 48 forces the valve piston 46 upwardly into sealing engagement with the gasket 47 against the pressure of the spring 51, while spring 49 acts through the medium of the stem 44 to maintain the valve 38 in engagement with the seat 39.

It will be understood that the reduction reservoir 26 together with the chamber 103 in the suppression valve device connected thereto are open to the atmosphere through the communications established in the release position of the brake valve device 1 as already described, so that the valve piston 94 is positioned as shown in the drawing and the chamber 92 is thus open to the atmosphere through the passages 93, 99 and 100. The associated diaphragms 91 and 80 accordingly assume their normal positions, the seat rib 81 on the diaphragm 80 being held away from the seating face on the web 76.

If the traffic condition is now changed so that an unfavorable indication results and the magnet 62 is consequently deenergized, the spring 65 becomes effective to seat the valve 56 and unseat the vent valve 59. Fluid under pressure is then permitted gradually to flow from the connected chambers 48 and 54 in the timing valve device 4 by way of the restricted passage 68, pipe 67, chamber 66, past the valve 59, and thence through the chamber 60, pipe 74, the chamber 73 in the suppression valve device 2, the aperture 75, past the diaphragm 80 to the chamber 77, and through the pipe 78 and the whistle device 79 to the atmosphere.

The restricted passage 68 in the timing valve device is so proportioned with respect to the timing reservoir 54 as to allow the lapse of a predetermined interval such that the motorman will have time to effect a service application of the brakes before the pressure of fluid in the chamber 48 is reduced sufficiently to enable the spring 51 to shift the valve piston 46 downwardly. If the pressure of fluid acting on the valve piston 46 is permitted to reduce sufficiently by the flow of fluid to atmosphere as just described to cause downward movement of the valve piston, the resultant unseating of the discharge valve 38 will vent fluid under pressure from the brake pipe 6 at an emergency rate by way of the pipe 41, the chamber 40, chamber 42, and the exhaust passage 43, thereby causing operation of the brake controlling valve device 5 in the usual manner to effect an emergency application of the brakes.

Control of the vehicle brakes is preferably left with the motorman, however, who may prevent the automatic emergency application of the brakes by moving the handle 12 of the brake valve device 1 to the service position thereof promptly after the initial sounding of the whistle device 79. As the brake valve device 1 is moved into the service position, a cavity 109 in the rotary valve 11 is brought into registration with the passage 28 and the passage 106, so that fluid under pressure is discharged at a service rate from the equalizing reservoir 18 through pipe and passage 17, the chamber 16, passage 106, cavity 109, passage 28, and the pipe 27 to the reduction reservoir 26 and to the chamber 103 in the suppression valve device 2. As the pressure of fluid in the chamber 16 in the brake valve device is thus reduced at a service rate, the brake pipe pressure acting in the chamber 19 moves the equalizing piston 13 upwardly, thereby unseating the equalizing discharge valve 14 so as to vent fluid under pressure from the brake pipe 6 by way of the pipe and passage 22, passage 21, chamber 19 and the exhaust passage 24. The brake controlling valve device 5 then operates in the well known manner in response to the reduction in brake pipe pressure to effect a service application of the brakes.

Meanwhile, as the pressure of fluid supplied in the manner just described to the reduction limiting reservoir 26 and to the chamber 103 connected thereto approaches that of equalization with the fluid pressure in the equalizing reservoir 18, or reaches a pressure somewhat less than the equalization value, such as five pounds below that value, the valve piston 94 is forced upwardly into engagement with the gasket 95, the seating face 101 being at the same time moved away from the seat 102. Fluid under pressure is thereupon supplied from the chamber 103 past the valve seat 102 to the chamber 92, and acts upon the diaphragm 91 to force said diaphragm, the followers 85 and 84, and the diaphragm 80 downwardly until the seat rib 81 engages the seating face of the web 76.

The diaphragm 80 is thus seated so as to close the communication from the chamber 73 to the chamber 77 in the suppression valve device within the time period required before the timing valve device 4 can operate, and further venting of fluid from the connected chambers 54 and 48 in the timing valve device 4 through the communications already explained is cut off. Since the reduction in the pressure of fluid in the chamber 48 is thus discontinued while the valve piston 46 is still held in its uppermost position as shown in the drawing, the discharge valve 38 is consequently maintained seated so that the venting of fluid under pressure from the brake pipe 6 at an emergency rate is avoided.

When the magnet 62 is again energized in response to a favorable traffic condition, the magnet moves the vent valve 59 to its seat and unseats the supply valve 56 so that the fluid pressure in the chambers 54 and 48 is restored to that normally maintained therein in the manner already described. The brake valve device 1 is then moved to the release position for effecting the release of the brakes in the well known manner.

Referring to Fig. 3 of the drawing there is illustrated a construction embodying a slightly modified form of our invention. In this form of our invention, the chamber 103 in the suppression valve device 2 is connected by way of a pipe 27a and a pipe 111 with the usual brake cylinder 110, which is adapted to be supplied with fluid under pressure by operation of the brake controlling valve device 5 in effecting an application of the brakes.

The operation of the apparatus shown in Fig. 3 will readily be understood from the description hereinbefore presented in connection with Fig. 1 of the drawing. When the motorman desires to prevent an automatic application of the brakes, he may effect a service application of the brakes in the usual manner. The brake controlling valve device 5 is thus operated to supply fluid under pressure through the pipe 111 to the brake cylinder 110, fluid under pressure also flowing through the pipe 27a to the chamber 103 in the suppression valve device 2. When the pressure of fluid in the chamber 103 is built up to a value at which the desired application of the brakes is insured, the suppression valve device 2 is operated in the manner already described to suppress the automatic train control application of the brakes.

It will be apparent from the foregoing description that our invention provides means embodied in a device of simple and inexpensive construction for suppressing an automatic train control application of the brakes, said device being operative only when a service application of the brakes is substantially completed.

While two illustrative embodiments of the invention have been described in detail, it is not our intention to limit its scope to these embodiments or otherwise than by the terms of the appended claims.

Having now described our invention, what we claim as new and desire to secure by Letters Patent, is:

1. In a train control equipment, in combination, fluid pressure brake means including a normally vented chamber, means operative to supply fluid under pressure to said chamber in effecting an application of the brakes and a manually controlled device for causing operation of said means; automatic control apparatus including means operative upon a predetermined reduction in the pressure of fluid in a timing chamber for effecting an application of the brakes and means operative in accordance with traffic conditions for venting fluid under pressure from said timing chamber; a valve for controlling communication through which fluid is vented from said timing chamber, and means operative upon a predetermined increase in pressure in the first-named chamber for effecting the operation of said valve to cut off the venting of fluid from said timing chamber.

2. In combination, fluid pressure brake means including a brake pipe, a reduction limiting reservoir, and a brake valve device operative to discharge fluid under pressure into said reduction limiting reservoir in effecting an application of the brakes, automatic control apparatus operative in accordance with traffic conditions to effect an application of the brakes, and means actuated by the pressure of fluid in said reduction limiting reservoir for preventing operation of said automatic control apparatus.

3. In combination, fluid pressure brake means including an equalizing reservoir, a reduction limiting reservoir, and a brake valve device operative to discharge fluid under pressure from said equalizing reservoir to said reduction limiting reservoir in effecting a service application of the brakes, automatic control apparatus operative in accordance with traffic conditions to effect an emergency application of the brakes, and means actuated upon a predetermined increase in the pressure of fluid thus supplied to said reduction limiting reservoir for preventing operation of said automatic control apparatus.

4. In combination, fluid pressure brake means including an equalizing reservoir, a reduction limiting reservoir, and a brake valve device operative to vent fluid under pressure from said equalizing reservoir to said reduction limiting reservoir in effecting an application of the brakes, automatic control apparatus operative in accordance with traffic conditions to effect an application of the brakes, fluid pressure means operated upon an increase in fluid pressure for preventing operation of said automatic control apparatus, and valve means subject to the pressure of fluid in said reduction limiting reservoir and operative upon a predetermined increase in said pressure for supplying fluid under pressure to said fluid pressure means.

5. In combination, fluid pressure brake means including an equalizing reservoir, a reduction limiting reservoir, and a brake valve device operative to vent fluid under pressure from said equalizing reservoir to said reduction limiting reservoir in effecting an application of the brakes, train control apparatus operative in accordance with traffic conditions to effect an application of the brakes, fluid pressure means operated upon an increase in fluid pressure for suppressing operation of said train control apparatus and valve means operative upon a predetermined increase in the pressure of fluid in said reduction limiting reservoir to supply fluid under pressure from said reservoir to said fluid pressure means.

6. In a train control equipment, in combination, a brake pipe, means operated upon a reduction in brake pipe pressure for effecting an application of the brakes, valve means operative upon a predetermined reduction in the pressure of fluid in a chamber for venting fluid under pressure from said brake pipe, means operative in accordance with traffic conditions for venting fluid under pressure from said chamber, a reduction reservoir, a brake valve device operative in effecting an application of the brakes to vent fluid under pressure into said reduction reservoir, a valve for controlling communication through which fluid is vented from said chamber, and means operative upon a predetermined increase in pressure in said reduction reservoir for effecting the operation of said valve to cut off the venting of fluid from said chamber.

7. In a train control equipment, in combination, a brake pipe, means operated upon a reduction in brake pipe pressure for effecting an application of the brakes, valve means operative upon a predetermined reduction in the pressure of fluid in a chamber for venting fluid under pressure from said brake pipe, means operative in accordance with traffic conditions for venting fluid under pressure from said chamber, a reduction reservoir, an equalizing reservoir, equalizing discharge valve means operative upon a reduction in pressure of fluid in said equalizing reservoir to discharge fluid under pressure from the brake pipe, means for venting fluid under pressure from said equalizing reservoir to said reduction reservoir, a valve for controlling communication through which fluid is vented from said chamber, and means operative upon a predetermined increase in pressure in said reduction reservoir for effecting the operation of said valve to cut off the venting of fluid from said chamber.

8. In combination, a brake pipe, a brake cylinder, a brake controlling valve device operative upon a reduction in the pressure of fluid in said brake pipe for supplying fluid under pressure to said brake cylinder, automatic control apparatus operative in accordance with traffic conditions to vent fluid under pressure from said brake pipe, means for delaying the operation of said automatic control apparatus for a predetermined interval following initial response to unfavorable traffic conditions, manually operable means for venting fluid under pressure from the brake pipe, and means operative upon a predetermined increase in the pressure of fluid supplied to said brake cylinder for suppressing operation of said automatic control apparatus.

9. In combination, fluid pressure brake means including a brake cylinder and means responsive to manual control to effect the supply of fluid under pressure to said brake cylinder for causing an application of the brakes, train control apparatus automatically operative in response to an adverse traffic signal to effect an application of the brakes, means for delaying operation of said apparatus for a predetermined interval following such a signal, and means operative on a predetermined increase in brake cylinder pressure to render said train control apparatus ineffective to cause an application of the brakes.

10. In combination, fluid pressure brake means including a brake cylinder and means responsive to manual control to effect the supply of fluid under pressure to said brake cylinder for causing an application of the brakes, train control apparatus automatically operative according to changes in traffic conditions to effect an application of the brakes, means for delaying operation of said apparatus for a predetermined interval after a change in traffic conditions, fluid pressure means operative upon an increase in fluid pressure for rendering said train control apparatus ineffective to cause an application of the brakes, and valve means actuated by the pressure of fluid in said brake cylinder for supplying fluid under pressure to said fluid pressure means.

11. In combination, fluid pressure brake means including a brake cylinder and means responsive to manual control to effect the supply of fluid under pressure to said brake cylinder for causing an application of the brakes, train control apparatus automatically operative according to changes in traffic conditions to effect an application of the brakes, means for delaying operation of said apparatus for a predetermined interval after a change in traffic conditions, fluid pressure means operative upon an increase in fluid pressure for rendering said train control apparatus ineffective to cause an application of the brakes, and valve means operative on a predetermined increase in the pressure of fluid in the brake cylinder to supply fluid under pressure from said brake cylinder to said fluid pressure means.

12. In a train control equipment, in combination, fluid pressure brake means including a normally vented chamber, means operative to supply fluid under pressure to said chamber in effecting an application of the brakes and a manually controlled device for causing operation of said means; automatic control apparatus including means operative upon a predetermined reduction in the pressure of fluid in a timing chamber for effecting an application of the brakes and means operative in accordance with traffic conditions for at one time supplying fluid under pressure to and at another time venting fluid under pressure from said timing chamber; a valve for controlling communication through which fluid is vented from said timing chamber, and movable abutment means operative upon a predetermined increase in pressure in the first-named chamber for effecting the operation of said valve to cut off the venting of fluid from said timing chamber.

13. In a train control equipment, in combination, fluid pressure brake means including an equalizing reservoir, a reduction limiting reservoir, and a brake valve device operative to discharge fluid under pressure from said equalizing reservoir to said reduction limiting reservoir in effecting an application of the brakes, automatic control apparatus including means operative upon a predetermined reduction in the pressure of fluid in a timing chamber for effecting an application of the brakes and means operative in accordance with traffic conditions for venting fluid under pressure from said timing chamber, a valve for controlling communication through which fluid is vented from said timing chamber, and movable abutment means operative upon a predetermined increase in the pressure of fluid supplied to said reduction limiting reservoir for effecting operation of said valve to cut off the venting of fluid from said timing chamber.

14. In a train control brake equipment, in combination, a brake cylinder, means responsive to manual control to effect the supply of fluid under pressure to said brake cylinder for causing an application of the brakes, automatic control apparatus including means operative upon a predetermined reduction in the pressure of fluid in a timing chamber for effecting an application of the brakes and means operative in accordance with traffic conditions for venting fluid under pressure from said timing chamber, a valve for controlling communication through which fluid is vented from said timing chamber, and means operative by fluid under pressure supplied to said brake cylinder in response to operation of said manually controlled means for seating said valve to prevent subsequent venting of fluid from said timing chamber.

15. In a train control brake equipment, in combination, automatic control apparatus including timing valve means operative upon a predetermined reduction in pressure of fluid in a timing chamber for effecting a train control application of the brakes and magnet valve means responsive to an adverse traffic signal for venting fluid under pressure from said timing chamber through a communication, fluid pressure operated valve means controlling the communication through which fluid is vented from said timing chamber, and manually controlled brake valve means movable to a brake application position for effecting supply of fluid under pressure to said fluid pressure operated valve means, whereby the venting of fluid from said timing chamber may be cut off in time to suppress a train control application of the brakes.

CARLTON D. STEWART.
JOHN B. HULL.